(12) United States Patent  
Anderson

(10) Patent No.: US 9,085,264 B2  
(45) Date of Patent: Jul. 21, 2015

(54) HITCH STEP ASSEMBLY

(71) Applicant: Cequent Consumer Products, Inc., Solon, OH (US)

(72) Inventor: Derek Anderson, Mayfield Heights, OH (US)

(73) Assignee: Cequent Consumer Products, Inc., Solon, OH (US)

(*) Notice: Subject to any disclaimer, the term of this patent is extended or adjusted under 35 U.S.C. 154(b) by 43 days.

(21) Appl. No.: 13/796,231

(22) Filed: Mar. 12, 2013

(65) Prior Publication Data

US 2013/0270791 A1    Oct. 17, 2013

Related U.S. Application Data

(60) Provisional application No. 61/624,071, filed on Apr. 13, 2012.

(51) Int. Cl.  
*B60R 3/00* (2006.01)

(52) U.S. Cl.  
CPC ..................... *B60R 3/007* (2013.01)

(58) Field of Classification Search  
CPC ............... B60D 1/06; B60D 1/58; B60R 3/00  
USPC ....................... 280/163, 164.2, 511  
See application file for complete search history.

(56) References Cited

U.S. PATENT DOCUMENTS

| | | | |
|---|---|---|---|
| 4,412,635 A | 11/1983 | Bateman | |
| 5,043,536 A | 8/1991 | DeBartolo, Jr. | |
| 6,145,861 A | 11/2000 | Willis | |
| 6,491,315 B2 | 12/2002 | Hagen et al. | |
| 6,511,086 B2 | 1/2003 | Schlicht | |
| 6,554,311 B1 | 4/2003 | Blankenship et al. | |
| 6,682,086 B1 | 1/2004 | Erickson | |
| 6,769,704 B2 | 8/2004 | Cipolla | |
| 6,851,692 B2 * | 2/2005 | Mitchell | 280/163 |
| D511,319 S | 11/2005 | Wang | |
| 7,081,197 B1 * | 7/2006 | Davis | 280/507 |
| 7,185,904 B1 | 3/2007 | Jones et al. | |
| 7,347,597 B2 | 3/2008 | French | |

(Continued)

FOREIGN PATENT DOCUMENTS

WO    2010128195    11/2010

OTHER PUBLICATIONS

International Search Report and the Written Opinion of the International Searching Authority, Cequent Consumer Products, Inc. Jul. 11, 2013.

(Continued)

*Primary Examiner* — Brodie Follman  
*Assistant Examiner* — Brian Cassidy  
(74) *Attorney, Agent, or Firm* — McDonald Hopkins LLC; Jeff Urian

(57) ABSTRACT

A hitch step selectively securable to a hitch ball receiver is shown and described. The hitch step may include a step body operatively engaged with an underside portion of the hitch ball receiver, where the step body has a width providing a stepping surface, and a clamp body selectively secured to the step body and positioned on a top portion of the hitch ball receiver. The hitch step may also include at least one fastener selectively securing the clamp body to the step body with the hitch ball receiver positioned between the clamp body and the step body.

32 Claims, 15 Drawing Sheets

(56) References Cited

U.S. PATENT DOCUMENTS

| | | |
|---|---|---|
| 7,419,177 B2 | 9/2008 | Kottke et al. |
| 7,661,694 B2 | 2/2010 | Krespach et al. |
| 8,393,629 B2 * | 3/2013 | Wotherspoon ............... 280/163 |
| 2004/0160034 A1 * | 8/2004 | Mitchell ..................... 280/163 |
| 2004/0207224 A1 | 10/2004 | Miller et al. |
| 2005/0040623 A1 | 2/2005 | Krespach et al. |
| 2005/0286257 A1 | 12/2005 | Trimmer et al. |
| 2006/0091637 A1 | 5/2006 | Knittel |
| 2009/0045604 A1 | 2/2009 | Bernart |
| 2011/0167688 A1 | 7/2011 | Frost |
| 2011/0285104 A1 * | 11/2011 | Wotherspoon ............. 280/164.1 |
| 2012/0299266 A1 * | 11/2012 | Gordon ....................... 280/163 |

OTHER PUBLICATIONS

U.S. Appl. No. 13/796,231, filed Mar. 12, 2013, Inventor: Derek Anderson, entitled Hitch Step Assembly.

Design U.S. Appl. No. 29/448,486, filed Mar. 12, 2013, Inventor: Derek Anderson, entitled Hitch Step.

* cited by examiner

HITCH STEP ASSEMBLY

CROSS-REFERENCE TO RELATED APPLICATION

This application claims the benefit from U.S. Provisional Patent Application No. 61/624,071 entitled "Hitch Step Assembly" filed on Apr. 13, 2012, which is hereby incorporated in its entirety by reference.

FIELD OF INVENTION

The present invention generally relates to a hitch step assembly, and more particularly to a hitch step assembly selectively securable to a vehicle.

BACKGROUND

Hitch assemblies are traditionally designed to be mounted to vehicles to allow the towing of towed vehicles such as trailers. Hitch assemblies are typically bolted directly to the towing vehicle's frame so as to attempt to generally distribute the stress applied during operation over the vehicle frame. Some exemplary hitch assemblies include a central frame member or crossbar having mounting brackets connected at each end for mounting the hitch assembly to the frame of the towing vehicle. A receiver box having a rearwardly facing opening or cavity is often mounted to the crossbar for the receipt of a hitch or draw bar that carries a hitch ball or other means of allowing connection to a trailer.

Hitch assemblies are often attached to large vehicles, especially vehicles capable of towing large loads. These large vehicles are often so large that it is difficult to effectively reach certain portions of the vehicle, e.g., the load bed, cargo area, the roof, and the like. Moreover, it is often desirable for an operator to enter the load bed of the vehicle, for example to assist with loading of cargo. It, however, can be very difficult for operators to enter the load bed due to the height of the vehicle. Conventional methods of entering the bed of the vehicle and for reaching a cargo area or roof of a vehicle often involve the operator having to step onto the rear bumper of the vehicle. Since vehicles vary in height from the ground, this method can be difficult, especially if the vehicle is a large truck or SUV.

Operators often install a stepping device or assembly onto the hitch assembly attached to the vehicle. However, many of these stepping devices can be difficult to attach, others preclude the use of the hitch assembly to tow the towed vehicle, and still others require disassembly of a ball mount each time the stepping device is to be used.

Therefore, there is a need for hitch step that can provide access to the cargo area, roof and/or load bed area of a vehicle while also allowing use of the trailer hitch assembly. This includes a hitch step that does not require the ball mount assembly to be removed to be attached and/or removed from the vehicle.

SUMMARY

A hitch step selectively securable to a hitch ball receiver is shown and described. The hitch step may include a step body operatively engaged with an underside portion of the hitch ball receiver, where the step body has a width providing a stepping surface, and a clamp body selectively secured to the step body and positioned on a top portion of the hitch ball receiver. The hitch step may also include at least one fastener selectively securing the clamp body to the step body with the hitch ball receiver positioned between the clamp body and the step body.

A hitch step selectively securable to a hitch ball receiver having a tongue may include a step body capable of circumscribing at least a portion of the tongue, where the step body has a width providing a step surface for a user, and a clamp body selectively secured to the step body and positioned over the tongue of the hitch ball receiver. The hitch step may also include at least one fastener selectively securing the clamp body to the step body.

A hitch step selectively securable to a hitch ball receiver may include a step body, a portion of which is positioned below the hitch ball receiver, where the step body has a width providing a stepping surface. The hitch step may also include a clamp body secured to the step body and positioned on a top portion of the hitch ball receiver, where the hitch ball receiver is clamped between the step body and clamp body.

BRIEF DESCRIPTION OF THE DRAWINGS

Operation of the invention may be better understood by reference to the detailed description taken in connection with the following illustrations, wherein.

DETAILED DESCRIPTION

Figure 1:
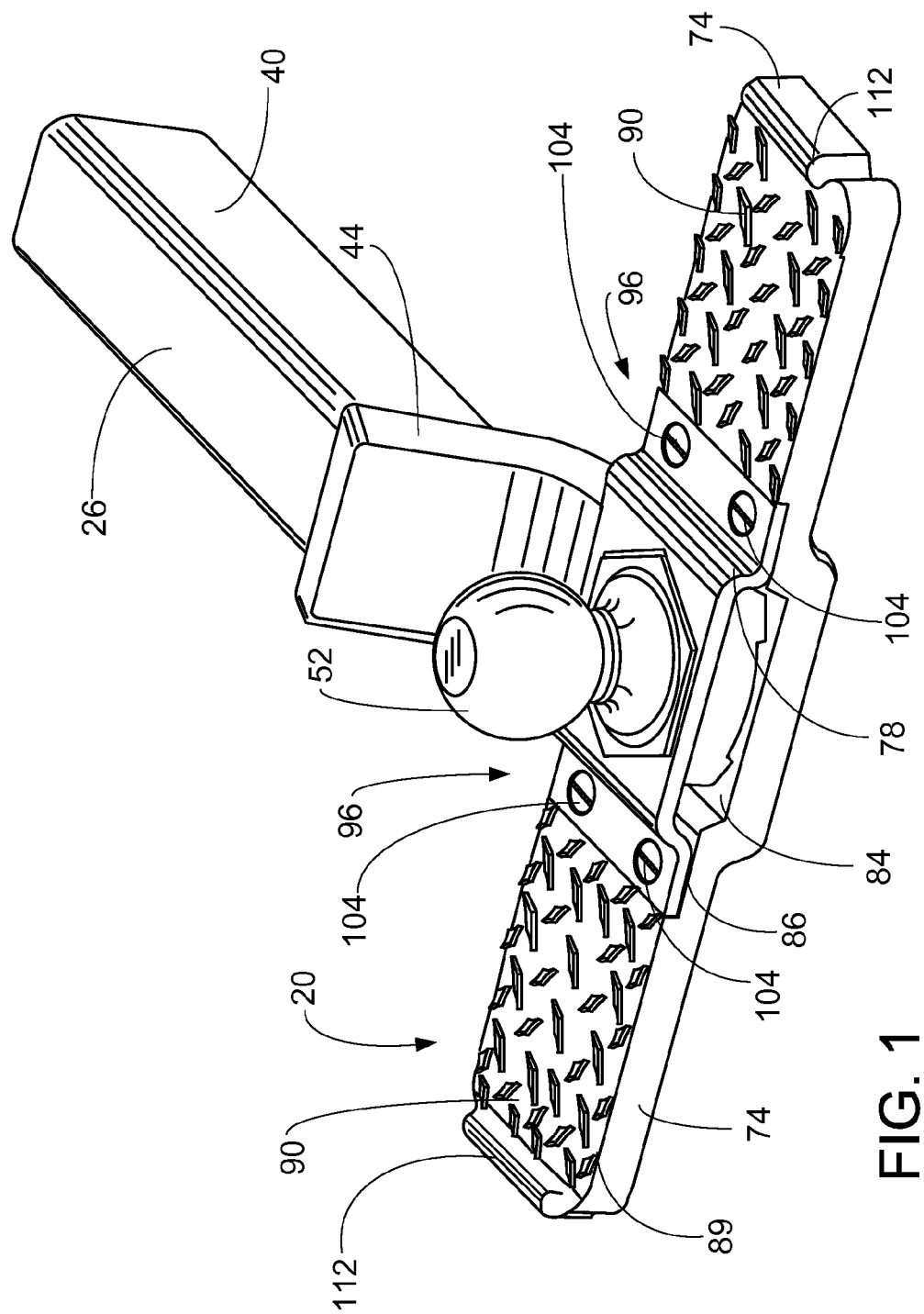
FIG. 1 is a perspective view of embodiments of a hitch step selectively secured to a hitch assembly.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A hitch step 20 capable of being selectively secured a towing vehicle 30 is shown in FIGS. 1-7. The hitch step 20 may be selectively secured to a hitch ball receiver or ball mount 26 secured to a hitch assembly 28 of the towing vehicle 30. The hitch assembly 28 may be configured to facilitate attachment of the towing vehicle 30 to a towed vehicle (not shown). The hitch assembly 28 may attach to the towing vehicle frame (not shown) in proximity to a rear portion of the towing vehicle 30 in any appropriate manner. The hitch assembly 28 may be configured to receive or connect to the hitch ball receiver 26 in any appropriate manner. The hitch assembly 28 shown is for exemplary purposes and the present teachings are not limited to a specific hitch assembly 28, but may apply to any appropriate hitch assembly.

The hitch ball receiver 26 may include a body 40 and a substantially L-shaped tongue 44 attached to one end of the body 40. The L-shaped tongue 44 may be made from plate steel, but is not limited to such. The hitch ball receiver 26 may include a hitch ball mounting aperture 48 in the tongue 44. A hitch ball 52 having a threaded mounting shank 56 may be capable of being selectively secured to the hitch ball receiver 26 in any appropriate manner. A fastener 60 may be capable of engaging the shank 56 to selectively secure the hitch ball 52 to the hitch ball receiver 26. Additionally, a nut 64 and a lock washer 68 may be operatively secured with the fastener 60. In operation, the mounting shank 56 of the hitch ball 52 may be aligned with and pushed through the hitch ball mounting aperture 48 in the hitch ball receiver 26. The lock washer 68 may be placed over the mounting shank 56 and the nut 64 may then be tightened on that mounting shank 56. The hitch ball receiver 26 shown, however, is for exemplary purposes and the present teachings are not limited to a specific hitch ball receiver 26, but may apply to any appropriate hitch ball receiver. By way of a non-limiting example, the hitch ball receiver 26 may be as described in U.S. Pat. No. 7,661,694, which is incorporated herein by reference.

The hitch step 20 may be selectively secured to the hitch ball receiver 26 in any appropriate manner. Moreover, the hitch step 20 may be selectively secured to the hitch ball receiver 26 while the hitch ball 52 remains secured to the hitch ball receiver 26. It may not, therefore, be necessary to remove the hitch ball 52 from the hitch ball receiver 26 to selectively secure the hitch step 20 to the hitch ball receiver 26. Accordingly, the hitch ball 52 may be secured to the hitch ball receiver 26 independent of the hitch step 20 being attached or not. The hitch ball 52 may be attached to the hitch ball receiver 26 and then the hitch step 20 may be selectively secured to the hitch ball receiver 26 or vice versa.

In some embodiments, the hitch step 20 may include a hitch step body 74 and a top clamp 78. The top clamp 78 may be selectively attached to the hitch step body 74, as described below in more detail. The hitch step body 74 may be capable of generally circumscribing at least a portion of the tongue 44 of the hitch ball receiver 26. This may result in the hitch step body 74 being generally free from obstructing the hitch ball 52 and the fastener 60 and generally permitting engagement of the hitch ball receiver 26 with the appropriate towed vehicle. In other words, the hitch step 20, and more specifically, the hitch step 74 and top clamp 78 may be attached to and/or removed from the hitch ball receiver 26 without generally interfering with operation of the hitch ball receiver 26.

Figure 2:
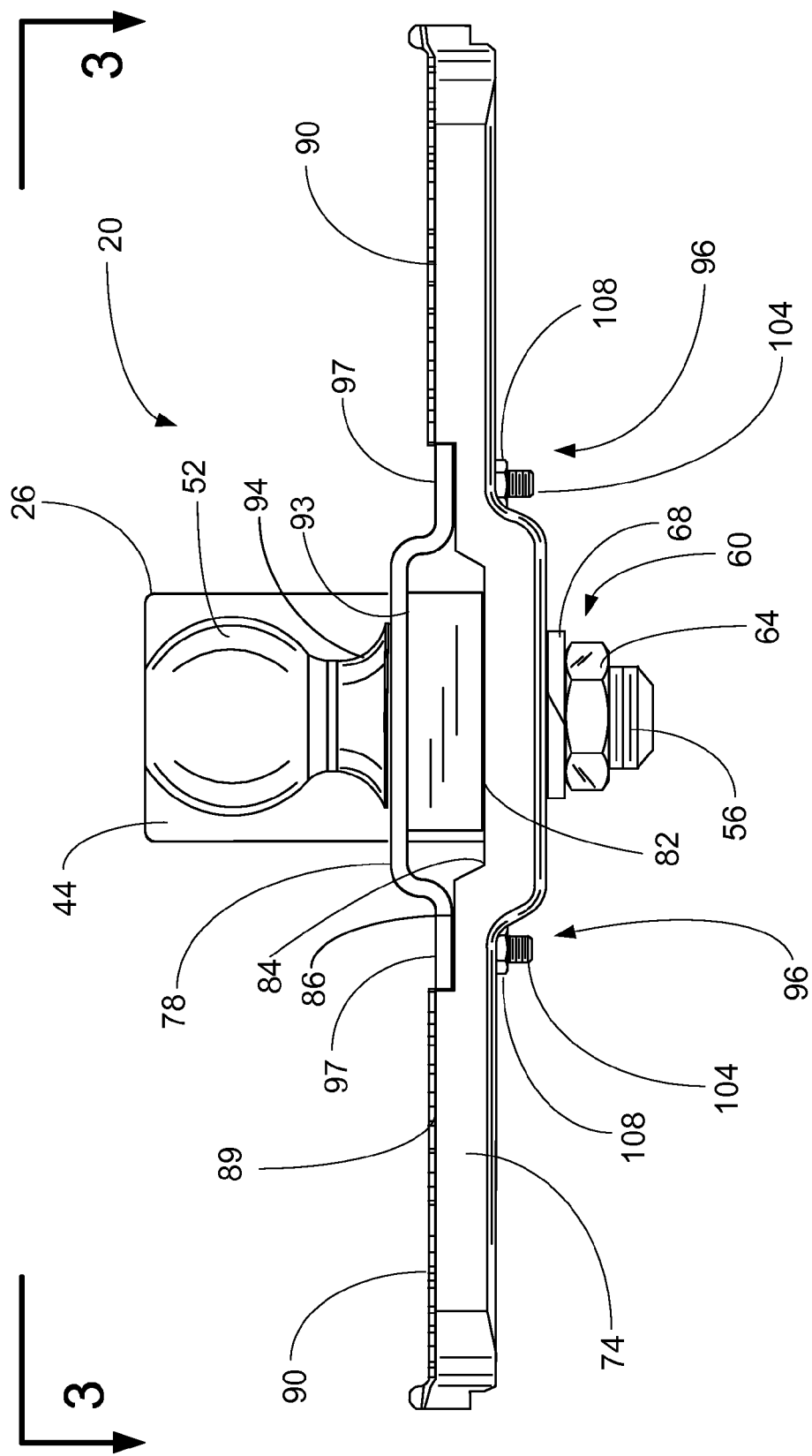
FIG. 2 is a front view of embodiments of a hitch step selectively secured to a hitch assembly.
Figure 4:
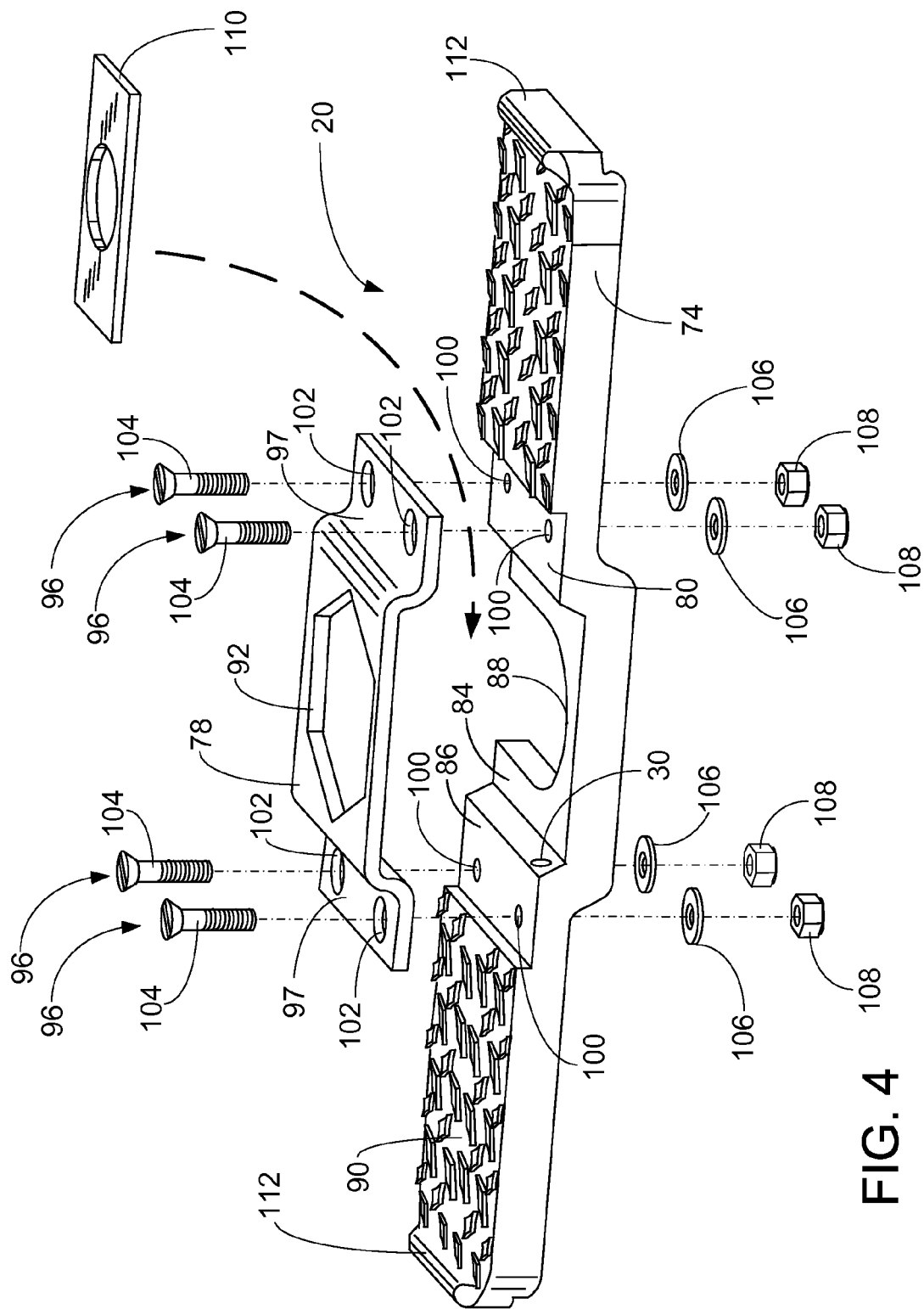
FIG. 4 is an exploded view of embodiments of a hitch step.

In some embodiments, the hitch step body 74 may engage an underside 82 of the tongue 44 of the hitch ball receiver 26. By way of a non-limiting example, the hitch step body 74, as best seen in FIGS. 2 and 4, may include a first stepped portion 84 and a second stepped portion 86. The first stepped portion 84 may include a recess 88. The recess 88 may be shaped and sized such that when the hitch step body 74 engages with the hitch ball receiver 26 the hitch step body 74 may not otherwise obstruct the hitch ball receiver 26, the tongue 44, the hitch ball 52 and the fastener 60 and the operation thereof. This may generally allow operation of the hitch ball receiver 26 without the hitch step body 74 obstructing such. By way of a non-limiting example, a towed vehicle may be attached to the hitch ball receiver 26, or more specifically, the hitch ball 52, regardless of the hitch step body 74 being attached to the hitch ball receiver 26. Further, the hitch ball 52 may be removed from the hitch ball receiver 26 regardless of the hitch step 74 being secured to the hitch ball receiver 26.

Figure 3:
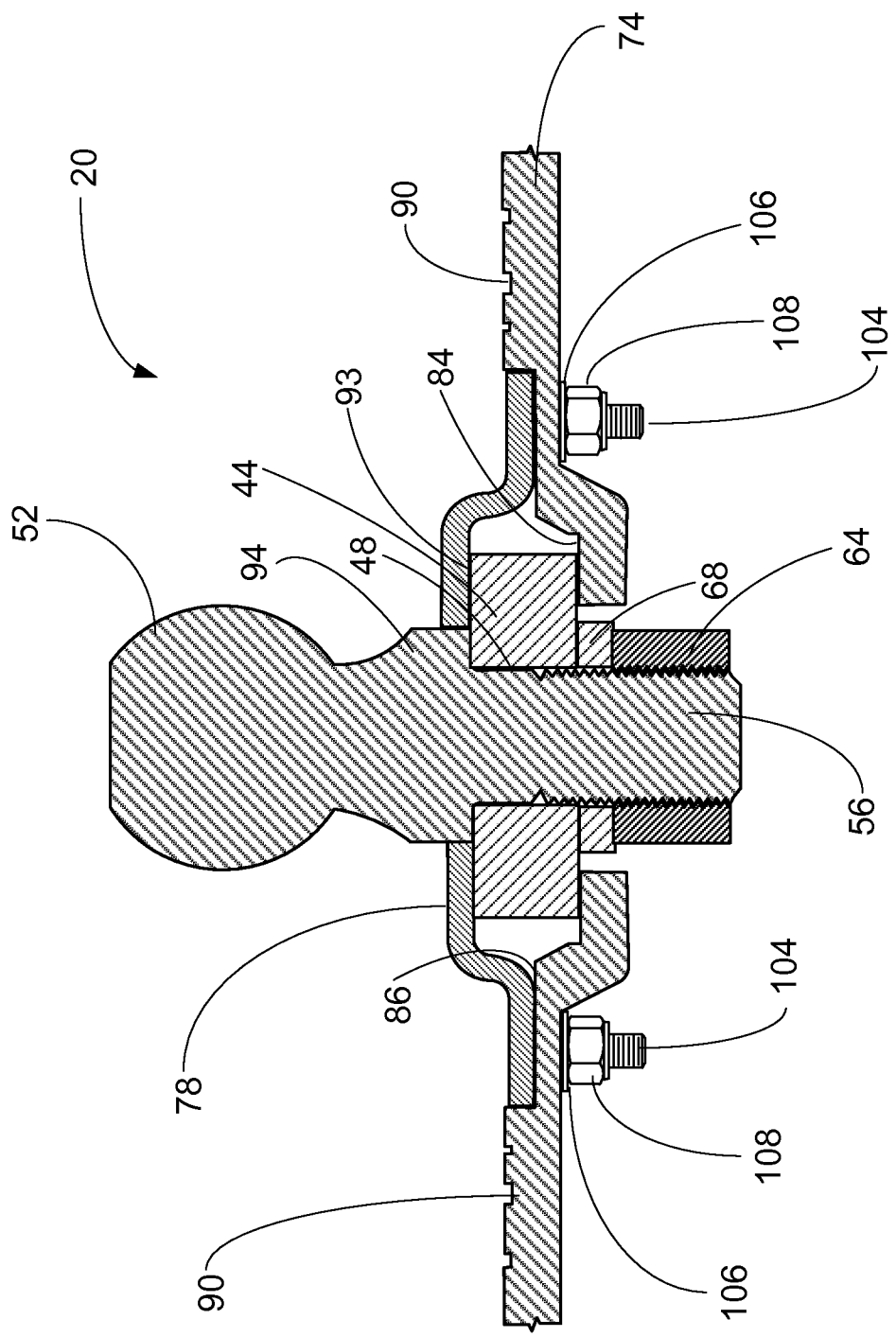
FIG. 3 is a cross-sectional view of the hitch step of FIG. 2 along lines 3-3.

In such embodiments, the first stepped portion 84 may engage or be positioned in proximity to the underside 82 of the tongue 44 of the hitch ball receiver 26 when the hitch step 20 is selectively secured to the hitch ball receiver 26, such as shown in FIG. 3. This may permit use and operation of the hitch ball receiver 26 despite the hitch step 20 being selectively secured thereto.

Figure 6:
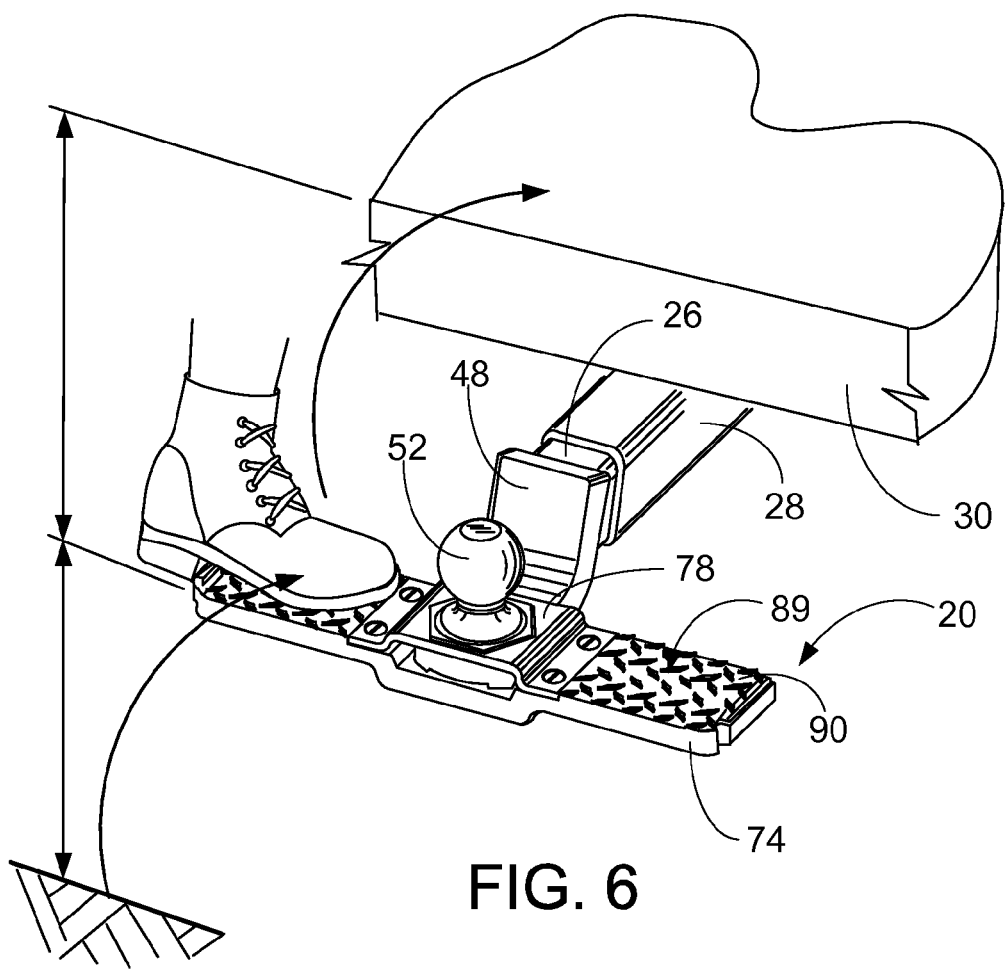
FIG. 6 is a perspective view of embodiments of a hitch step selectively secured to a hitch assembly attached to a rear of a towing vehicle.
Figure 7:
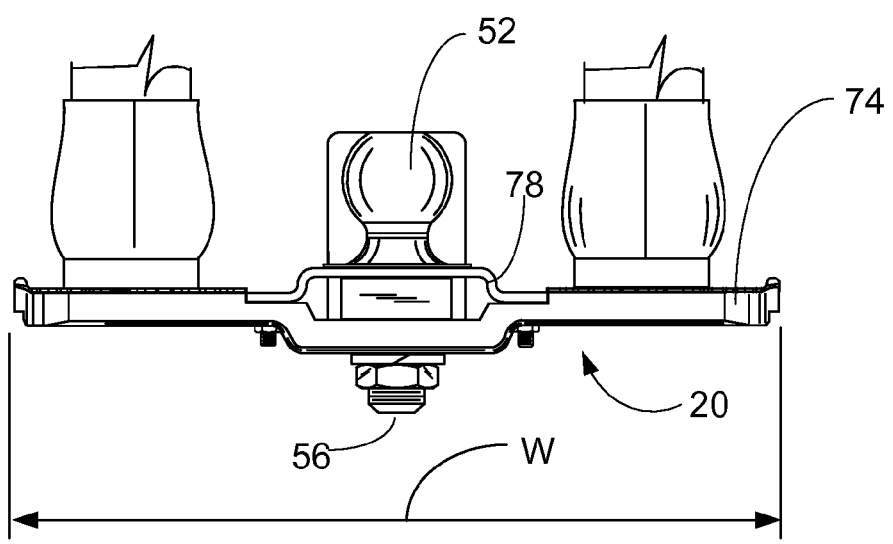
FIG. 7 is a front view of embodiments of a hitch step selectively secured to a hitch assembly with a user's feet thereon.
Figure 8:
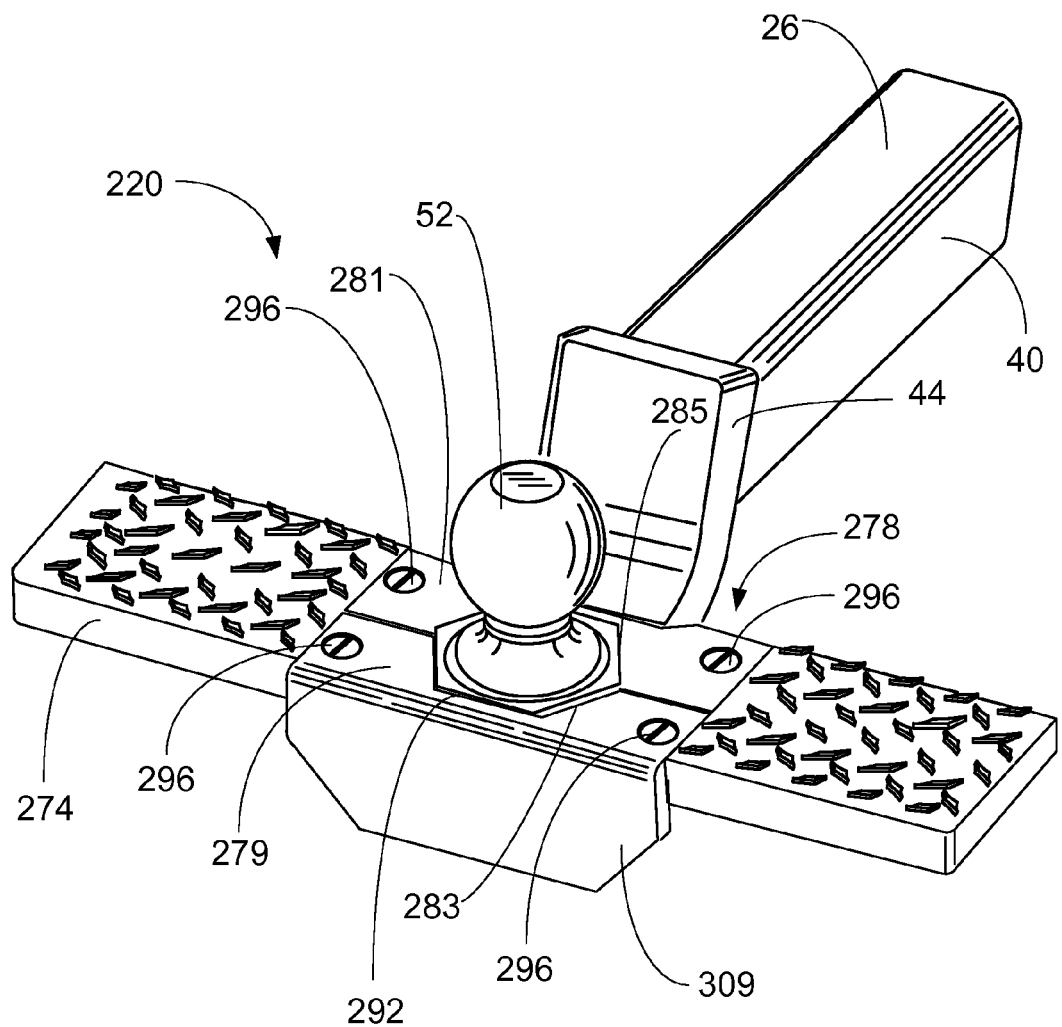
FIG. 8 is a perspective view of other embodiments of a hitch step selectively secured to a hitch assembly.

Further, the hitch step body 74 may have a width W, as seen in FIG. 7. The width W of the hitch step body 74 may generally extend transversely from the hitch ball receiver 26 such that the hitch step body 74 may provide a surface on to which one can stand and/or step, as shown in FIG. 6. The hitch step body 74 may include a top surface 89 with a fraction surface 90 positioned thereon. The fraction surface 90 may be any appropriate surface that may generally provide fraction for an operator when stepping and/or standing on the hitch step 20. In some embodiments, the traction surface 90 may include a generally diamond shaped pattern, or may be of any other appropriate pattern, that may be formed in the step body, such as by being integrally formed therewith or formed through a subsequent operation. In other embodiments, the traction surface 90 may include "tread" attached the top surface 89 of the hitch step body 74 in any appropriate manner. This tread may provide traction for one standing or stepping on the hitch step 20. This tread may be rubber, metal, or any other desired material.

Figure 5:
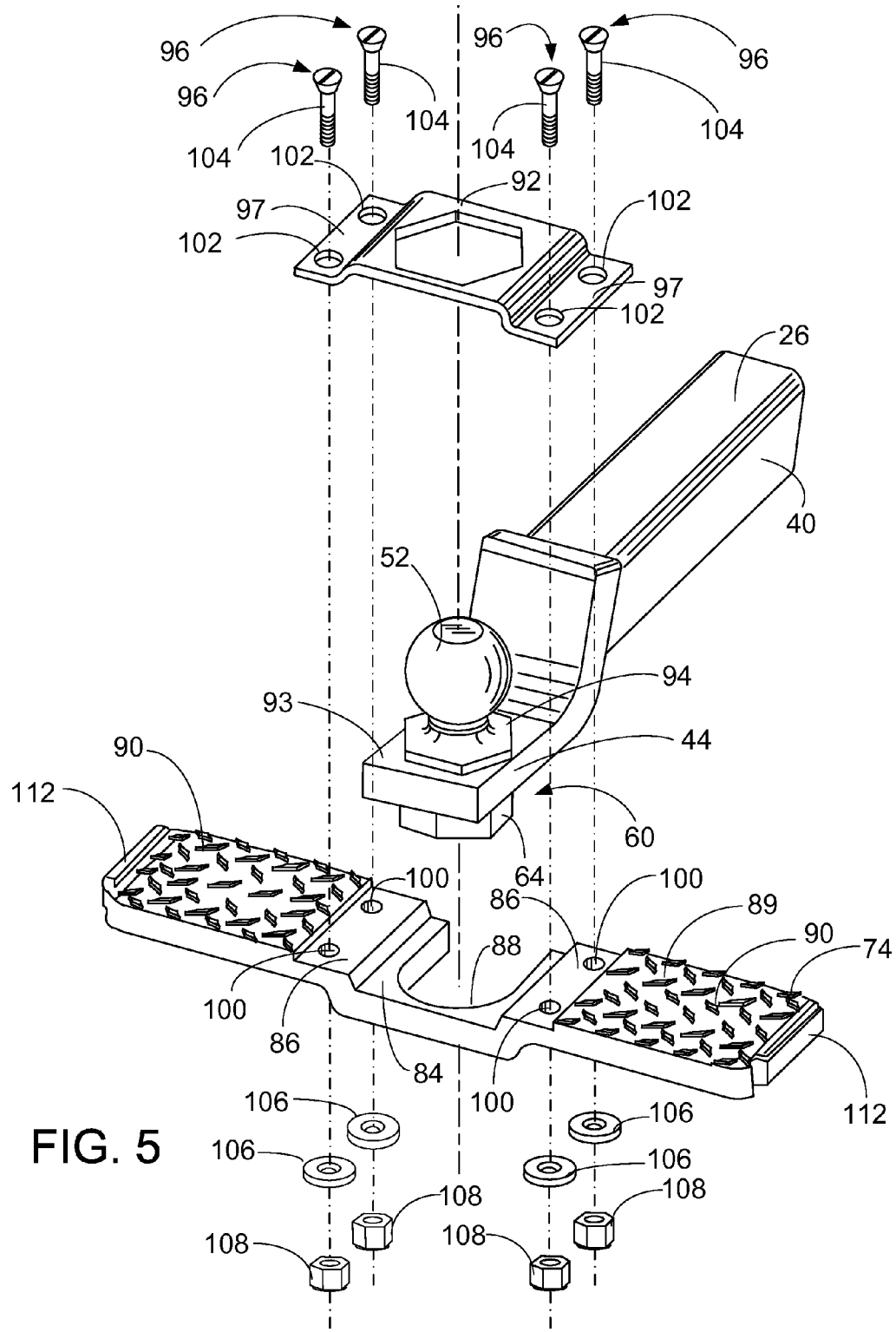
FIG. 5 is an exploded view of embodiments of a hitch step selectively securable to a hitch assembly.

In some embodiments, the hitch step body 74 may be selectively secured to the hitch ball receiver 26 through use of the top clamp 78. In these embodiments, the top clamp 78 may include an aperture 92, such as that shown in FIG. 4 by way of non-limiting example, which may be sized and shaped to generally allow the top clamp 78 to be positioned over the hitch ball 52 when the hitch ball 52 is attached to the tongue 44. The aperture 92 may be of a shape and size such that the top clamp 78 may be placed over the hitch ball 52 and engage or be in proximity to a top portion 93 of the tongue 44. Additionally, the aperture 92 may be shaped and sized to generally engage or be in close proximity to a base 94 of the hitch ball 52. By way of a non-limiting example, the aperture 92 may be of a generally hexagonal shape such that it generally matches a hexagonal shape of the base 94 of the hitch ball 52, an example of which is shown in FIG. 5. While the shape of the aperture 92 and the base 94 may be generally the same, the present teachings are not limited to such. In other embodiments, the aperture 92 may be of a generally different shape than that of the base 94 of the hitch ball 52. For example, the aperture 92 may be of a generally hexagonal shape and the base 94 may be of a generally circular shape, or vice versa.

The top clamp 78 may be selectively secured to the hitch step body 74 such that the top clamp 78 and hitch step body 74 may generally clamp to the hitch ball receiver 26, or more specifically, the tongue 44. In some embodiments, at least one fastener 96 may selectively secure the top clamp 78 to the hitch step body 74. By way of a non-limiting example, four fasteners 96 may be utilized, but the present teachings are not limited to such. Any appropriate number of fasteners 96 may be utilized. In such embodiments, the hitch step body 74 may be positioned below the tongue 44 of the hitch ball receiver 26, as described above. The top clamp 78 may then be positioned over the tongue 44 of the hitch ball receiver 26, i.e., the top clamp 78 may be positioned over the hitch ball 52 such that the hitch ball 52 passes through the aperture 92 of the top clamp 78. The top clamp 78 may include stepped portions 97 on each end of the top clamp 78. The stepped portions 97 may be shaped and sized to engage the stepped surface 86 of the step body 74 when the top clamp 78 is positioned over the hitch ball 52 and tongue 44 of the hitch ball receiver 26. The stepped portions 97 may generally create space between the top clamp 78 and hitch step body 74 so that the top clamp 78 and hitch step body 74 when selectively secured together may appropriately clamp on to the respective top portion 93 and underside 82 of tongue 44 of the hitch ball receiver 26.

The top clamp 78 and hitch step body 74 being selectively secured together may generate sufficient clamping force to secure the hitch step 20 to the hitch ball receiver 26 without any additional engagement of features of the hitch step 20 and hitch ball receiver 26. By way of a non-limiting example, the clamping force may sufficient to make it unnecessary for the hitch step 20 to engage side portions of the hitch ball receiver 26, or more specifically, sidewalls of the tongue 44. Specifically, the clamping force applied by selectively securing the top clamp 78 and hitch step body 74 as described above may make it unnecessary for both of the top clamp 78 and the hitch step body 74 to engage sidewalls of the tongue 44 to secure the hitch step 20 to the hitch ball receiver 26.

In some embodiments, the step body 74 may include a plurality of apertures 100 positioned on the second stepped surface 86, e.g., four apertures 100 may be positioned on the second stepped surface 86. Similarly, the top clamp 78 may include a plurality of apertures 102, e.g., four apertures 102 may be positioned on the stepped portion 97 of the top clamp 78. The apertures 100, 102 of the step body 74 and top clamp 78 may be generally alignable with each other such that the fasteners 96 may be inserted into and through the apertures 100, 102 when the stepped portion 97 of the top clamp 78 is engaged with the second stepped portion 86 of the step body 74. By way of a non-limiting example, the fastener 96 may include four bolts 104 sized to engage the apertures 100, 102, such as four ¼×20 mounting bolts, four washers 106, such as ¼" flat washers and four nuts 108, such as ¼-20 lock-nuts.

Once the bolts 104 are engaged through the appropriate apertures 100, 102, the washer 106 may be engaged with the bolts 104 and the lock nuts 108 may be operatively secured to the bolts 104. This may selectively secure the hitch step body 74 with the top clamp 78 and specifically, may selectively secure the hitch step 20 with the hitch ball receiver 26. In some embodiments, the top clamp 78 may have a width that is less than the width W of the hitch step body 74. Specifically, the top clamp 78 may have a limited width that generally may prevent an operator from stepping or standing on the top clamp 78 when the hitch step 20 is secured to the hitch ball receiver 26.

Figure 3A:
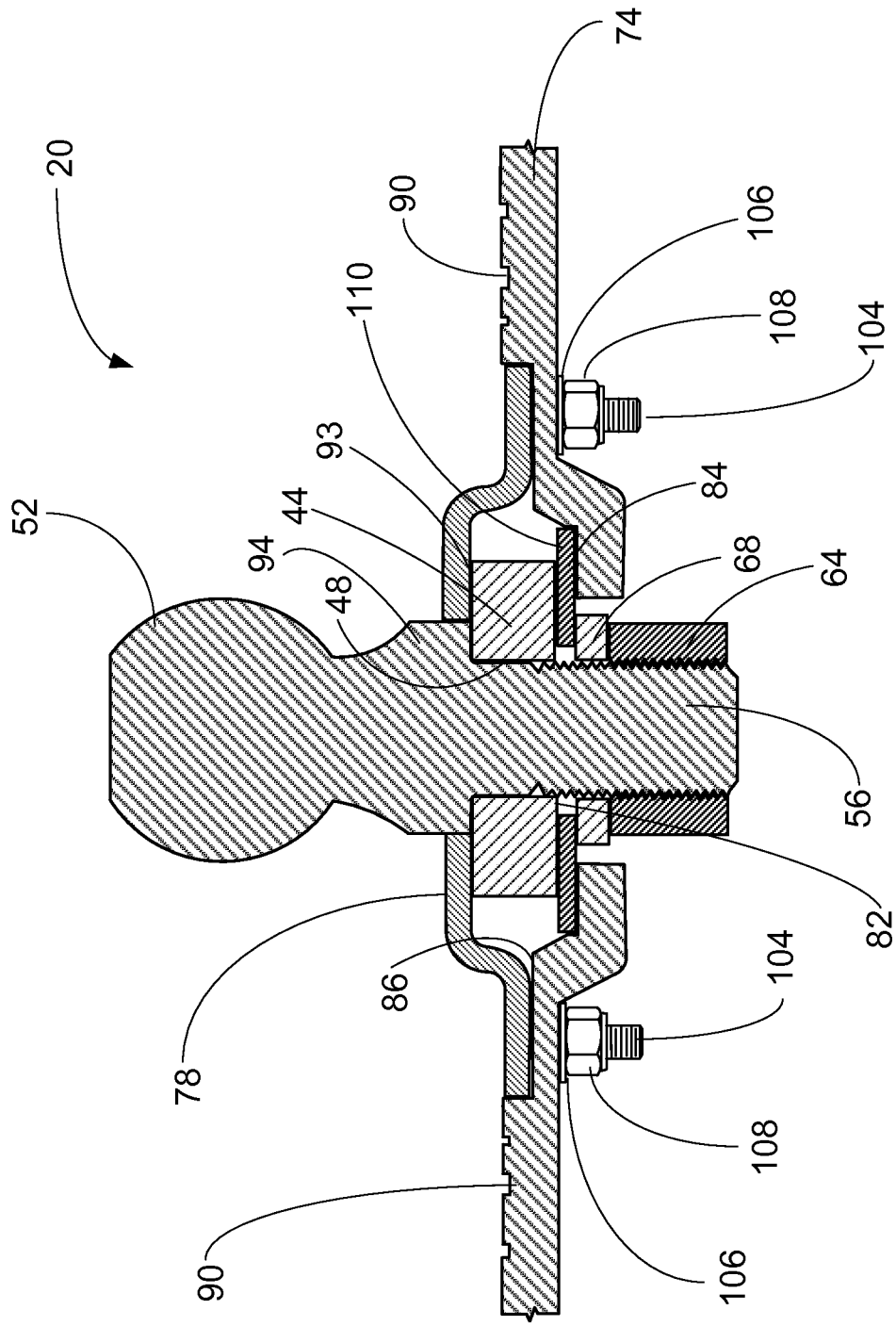
FIG. 3A is a cross-sectional view of an embodiment of a hitch step used with a spacer.

In some embodiments, the hitch step 20 may include a spacer 110, such as shown in FIGS. 3A and 4. The spacer 110 may be used when it is desired to add extra clamping surface to a hitch ball receiver 26 for the hitch step body 74 and top clamp 78 to engage such as when used with a thinner tongue 33. To use the spacer 110, the nut 64 may be removed from the hitch ball 52. Then, the spacer 110 may be inserted onto the mounting shank 56 of the hitch ball 52. Finally, the nut 64 may be replaced and tightened to secure the spacer 110 onto the hitch ball 52 and the hitch ball receiver 26. In other embodiments, the spacer 110 may be of a shape and size that the nut 64 need not be removed from the hitch ball 52. The spacer 110 may fit over the fastener 60 and nut 64 and engage the underside 82 of the tongue 44. The hitch step body 74 and top clamp 78 may then be selectively secured to the hitch ball receiver 26 as described above. The spacer 110, however, may not be needed in some embodiments.

The hitch step 20 may further include lateral edges 112 that may provide additional traction for an operator, provide an apparatus to clean the operator shoes, and may provide a tactile indication to the operator that the edge of the hitch step 20 may be close. Specifically, the lateral edges 112 may project upwardly above the main surface of step body 74 as shown in the drawings. The lateral edges 112 may be integrally formed with the step body 74, attached thereto through a subsequent operation, or formed through a combination of both. In addition, the lateral edges 112 may be formed with a traction surface (not shown), which may be similar to the traction surface 90.

The hitch step body 74, clamp body 78, the spacer 110, and fasteners 96 may be made of any appropriate material. By way of a non-limiting example, the hitch step body 74 may be made of cast aluminum, the clamp body 78 may be made of alloy steel, the spacer may be made of alloy steel, and the fastener 96 may be made of stainless steel. It should be understood, however, that the present teachings are not limited to these materials and that any the components may be made of any appropriate material.

Upon attachment of the hitch ball receiver 26 to the hitch assembly 28, including attaching the hitch ball 52 to the hitch ball receiver 26 as indicated above, the hitch step 20 may be selectively secured to the hitch ball receiver 26. In such embodiments, the hitch ball 52 does not need to be removed form the hitch ball receiver 26 in order to selectively secure the hitch step 20. Once the hitch step 20 is selectively secured to the hitch ball receiver 26, an operator may use the hitch step 20 as a step to reach cargo in the load bed, cargo on the roof, travel on to the load bed and the like. The width W of the step body 74 may provide an appropriately sized stepping surface making it easier for an operator get onto the towing vehicle 30 as desired. In addition, as shown in FIG. 7, the width W of the step body 74 may allow an operator to stand with both feet on the hitch step 20 and more particularly on the step body 74. In order to remove the hitch step 20 from the hitch ball receiver 26 the steps described above may generally be reversed. Further, the hitch step 20 may be attached to the hitch ball receiver 26 regardless of whether the hitch ball 52 is attached to the hitch ball receiver 26.

Additional embodiments of a hitch step according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired hitch step without departing from the spirit and scope of the present invention.

In other embodiments, examples of which are shown in FIGS. 8-11, the hitch step 220 may include a hitch step body 274 and a top clamp 278. The top clamp 278 may include a first clamping body 279 and a second clamping body 281. In such embodiments, the first and second clamping bodies 279, 281 may include recessed portions 283, 285, respectively. The recessed portions 283, 285 may be shaped and sized such that when the first and second clamping bodies 279, 281 are selectively secured to the hitch body step 274, the recessed portions 283, 285 may form an aperture 292 similar to the aperture 92 described above. In such embodiments, the hitch step 220 may be selectively secured to the hitch ball receiver 26 without having to remove the hitch ball 52.

The top clamp 278, or more specifically, the first and second clamping bodies 279, 281 may each include at least one aperture 302 to which fastener 296 may engage. The hitch step 274 may also include at least one aperture 300 to which the fastener 296 may engage. In these embodiments, the hitch step body 274 may be appropriately positioned relative to the hitch ball receiver 26. The first and second clamping bodies 279, 281 may be positioned over the tongue 44 such that the recessed portions 283, 285 form the aperture 292 through which the hitch ball 52 may extend. The fasteners 296 may engage the apertures 302 of the first and second clamping bodies 279, 281 and the apertures 300 of the hitch step body 274. This may then selectively secure the hitch step 220 with the hitch ball receiver 26.

The hitch step body 274 may engage the underside 82 of the tongue 44 of the hitch ball receiver 26. By way of a non-limiting example, the hitch step body 274 may include a first stepped portion 284 and a second stepped portion 286. The first stepped portion 284 may include a recess 288. The recess 288 may be shaped and sized such that when the hitch step body 274 engages with the hitch ball receiver 26, the hitch step body 274 may not otherwise obstruct the hitch ball receiver 26, the tongue 44, the hitch ball 52, and the fastener 60 and the operation thereof. This may generally allow operation of the hitch ball receiver 26 without the hitch step body 274 obstructing such. By way of a non-limiting example, a towed vehicle may be attached to the hitch ball receiver 26, or more specifically, the hitch ball 52, regardless of the hitch step body 274 being attached to the hitch ball receiver 26. Further, the hitch ball 52 may be removed from the hitch ball receiver 26 regardless of the hitch step 274 being secured to the hitch ball receiver 26.

In these embodiments, the first stepped portion 284 may engage or be positioned in proximity to the underside 82 of the tongue 44 of the hitch ball receiver 26 when the hitch step 220 is selectively secured to the hitch ball receiver 26. This may permit use and operation of the hitch ball receiver 26 despite the hitch step 220 being selectively secured thereto.

Similar to the above, the fasteners 296 may include four bolts 304 sized to engage the apertures 300, 302, such as four ¼×20 mounting bolts, four washers 306, such as ¼" flat washers and four nuts 308, such as ¼-20 lock-nuts. Additionally, the step body 274 may include a fraction surface 290 and lateral edges 312 that may provide additional traction for an operator and/or tactile indication to the operator that the edge of the hitch step 220 may be close.

In some embodiments, a panel member 309 may be attached to the first clamping body 279 in any appropriate manner. In some embodiments, the panel member 309 may be integrally formed with the first clamping body 279, or in the alternative, the panel member 309 may be attached by any appropriate means to the first clamping body 279. The panel member 309 may have an extending portion where a logo, branding, or the like may be placed.

Figure 9:
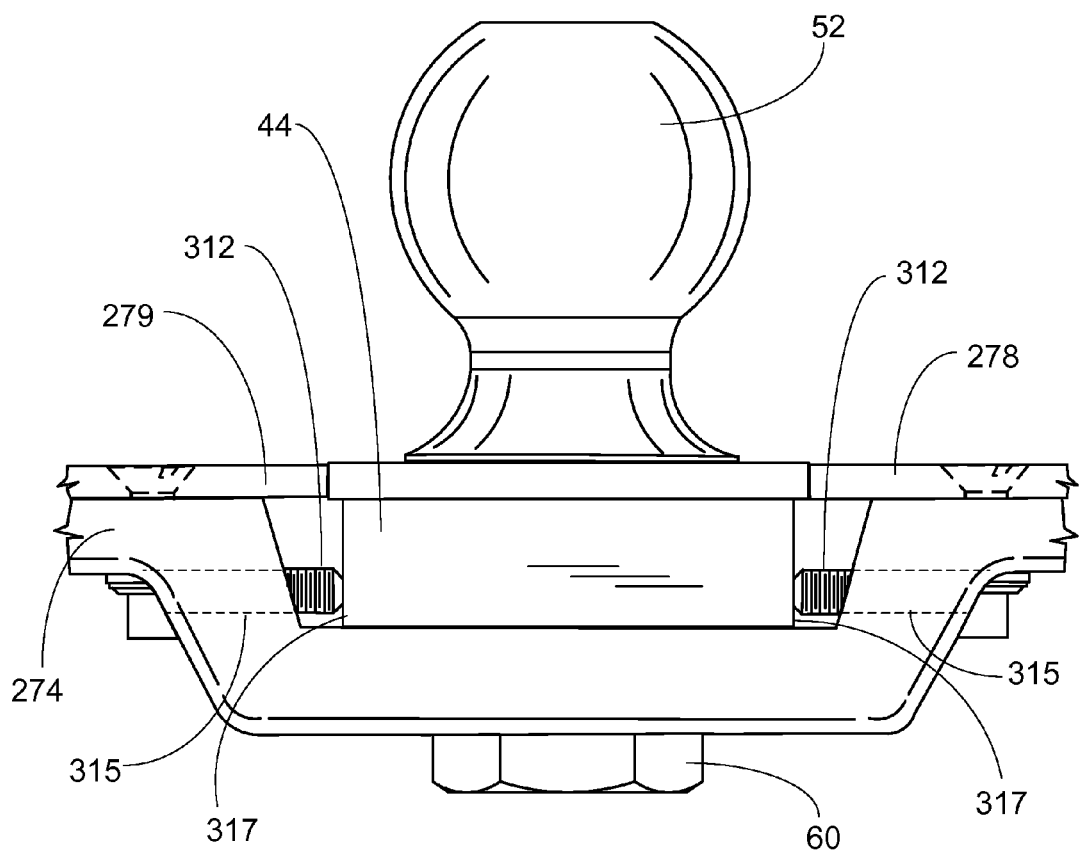
FIG. 9 is a partial front view of other embodiments of a hitch step selectively secured to a hitch assembly.
Figure 10:
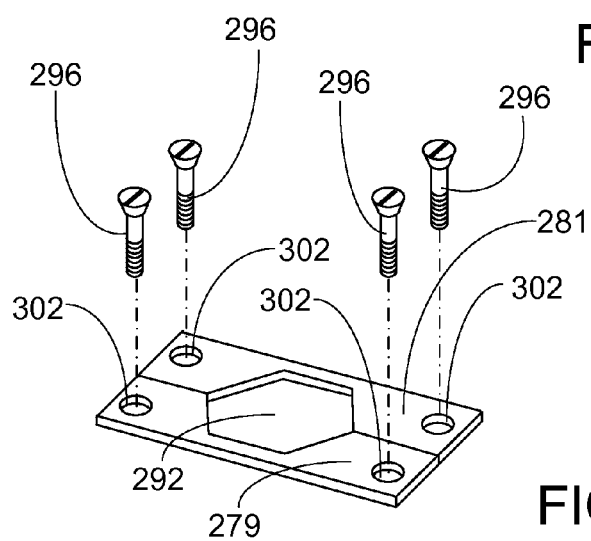
FIG. 10 is a perspective view of a clamp plate and fasteners of other embodiments of a hitch step.
Figure 11:
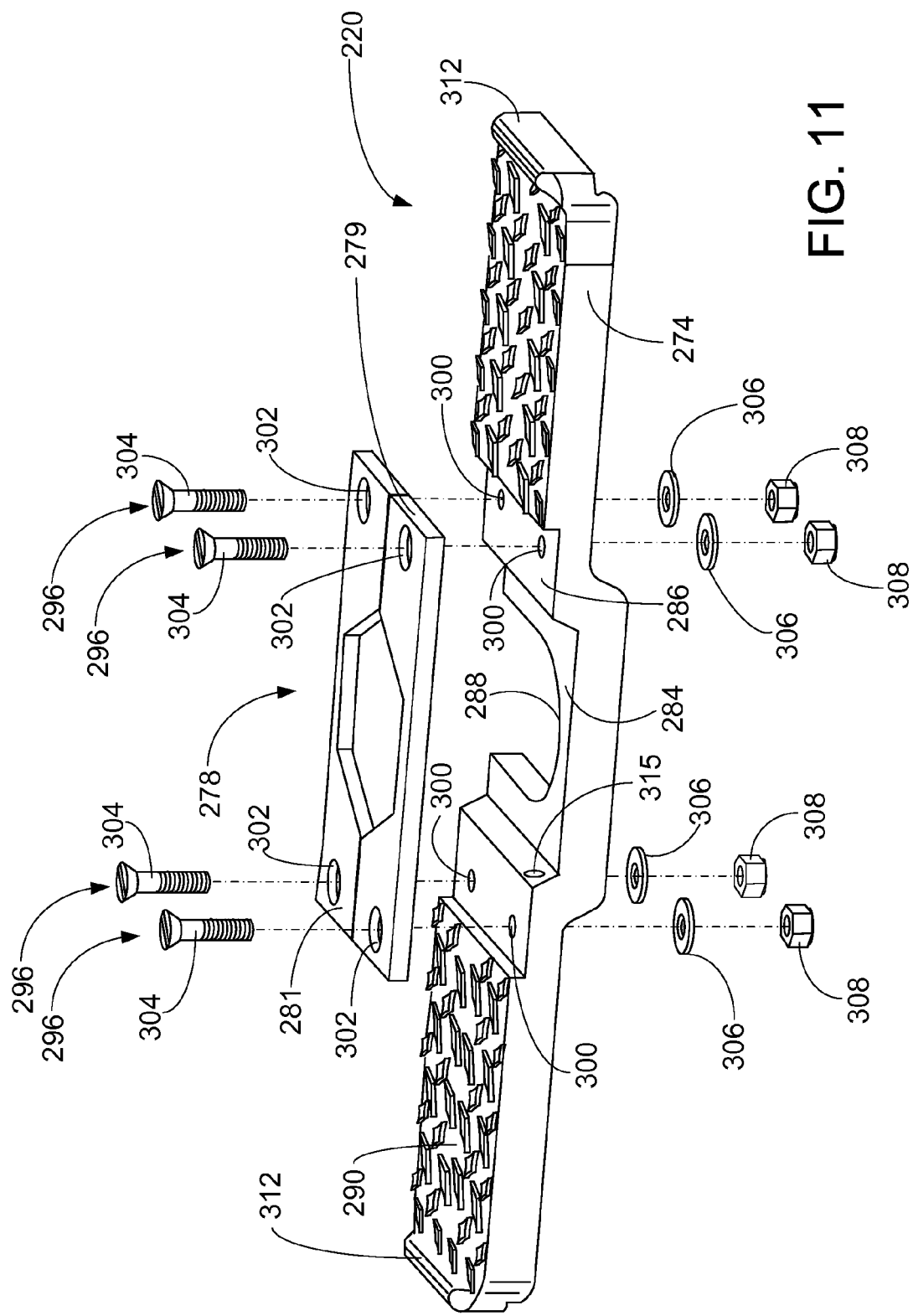
FIG. 11 is an exploded view of embodiments of a hitch step.
Figure 12:
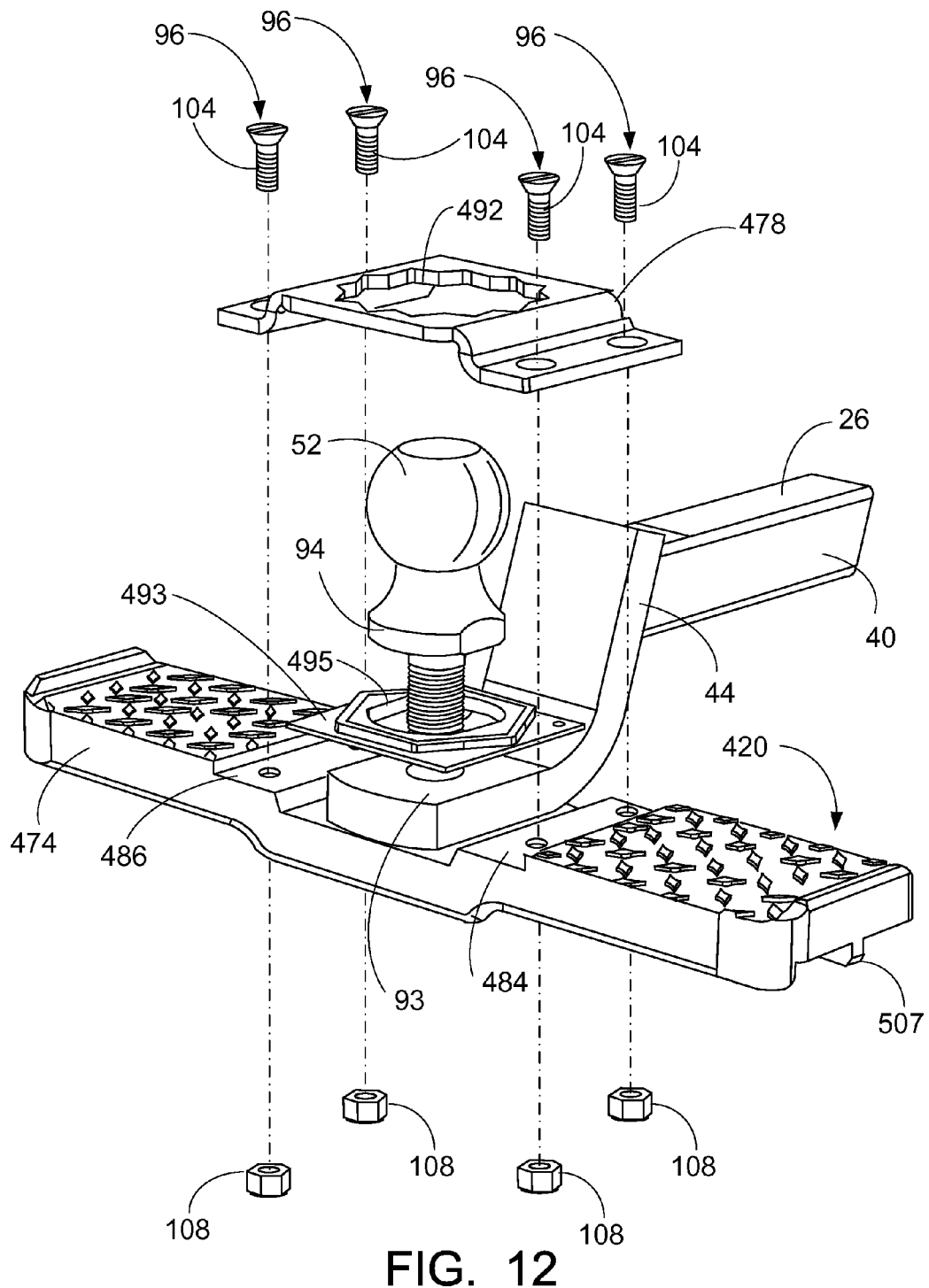
FIG. 12 is a perspective exploded view of embodiments of a hitch step utilizing an adapter.

In some embodiments, the hitch step 220 may include locating screws 312. The locating screws 312 may extend from sides of the step body 274 as shown in FIG. 9. The locating screws 312 may further secure the hitch step 220 to the hitch ball receiver 26 and may further appropriately position the hitch step 220 relative to the hitch ball receiver 26. In these embodiments, the hitch step 274 may include apertures 315, which are shown in FIGS. 9 and 11. The locating screws 312 may engage the apertures 315 and may pass therethrough. Once the locating screws 312 pass through the apertures 315, the locating screws 312 may engage side portions 317 of the tongue 44.

The locating screws 312 engaging the side portions 317 of hitch ball receiver 26, or more specifically, the tongue 44, may provide additional support for the hitch step 200 when selectively secured to the hitch ball receiver 26. The locating screws 312, when engaged with the side portions 317, may apply pressure thereto. This pressure may generally help prevent the hitch step 200 from moving relative to the hitch ball receiver 26 during operation thereof, but may not be utilized in some embodiments.

In other embodiments, examples of which are shown in FIGS. 12-19, a hitch step 420 may include a hitch step body 474 and a top clamp 478. The top clamp 478 may be selectively attached to the hitch step body 474 in any appropriate manner. The hitch step body 474 may generally circumscribe at least a portion of the tongue 44 of the hitch ball receiver 26. This may result in the hitch step body 474 being generally free from obstructing the hitch ball 52 and the fastener 60 and generally permitting engagement of the hitch ball receiver 26 with the appropriate towed vehicle independent of the hitch ball 420 being attached or not.

The hitch step body 474 may engage the underside 82 of the tongue 44 of the hitch ball receiver 26. Specifically, the hitch step body 474 may include a first stepped portion 484 and a second stepped portion 486. The first stepped portion 484 may include a recess 488. The recess 488 may be shaped and sized such that when the hitch step body 474 engages with the hitch ball receiver 26 the hitch step body 474 may not otherwise obstruct the hitch ball receiver 26, the tongue 44, the hitch ball 52 and the fastener 60 or the operation thereof. This may generally allow operation of the hitch ball receiver 26 without the hitch step body 474 obstructing such. By way of a non-limiting example, a towed vehicle may be attached to the hitch ball receiver 26, or more specifically, the hitch ball 52, independent of the hitch step body 474 being attached to the hitch ball receiver 26. Further, the hitch ball 52 may be removed from the hitch ball receiver 26 regardless of the hitch step 474 being secured to the hitch ball receiver 26.

The hitch step body 474 may be selectively secured to the hitch ball receiver 26 through use of the top clamp 478. In these embodiments, the top clamp 478 may include an aperture 492, which may be sized and shaped to generally allow the top clamp 478 to be positioned over the hitch ball 52 when the hitch ball 52 is attached to the tongue 44.

The aperture 492 may be of a shape and size such that the top clamp 478 may be inserted over the hitch ball 52 and engage or be in proximity to a top portion 93 of the tongue 44. Additionally, the aperture 492 may be shaped and sized to generally engage or be in close proximity to a base 94 of the hitch ball 52. By way of a non-limiting example, the aperture 492 may be of a generally non-circular shape such as the star shape shown in FIG. 16. The aperture 492 may include a plurality of pointed edges generally radiating from the center of the aperture 492. This shape of the aperture 492 may allow the top clamp 478 to fit over a plurality of different shaped bases 94 of hitch balls 52.

The hitch step 420 may optionally include an adapter 493, such as shown in FIGS. 12-14 and 17-19. The adapter 493 may generally fit over the hitch ball 52, or more specifically the base 94 of the hitch ball 52 and immediately below the top clamp 478. The adapter 493 may be used in some of embodiments of the hitch step 420, but may not be required. The adapter 493 may be made of any appropriate material, including, without limitation, plastic, rubber, aluminum, steel or any combination of such materials. As shown, the adapter 493 may be made of a plastic material. The adapter 493 may be used to selectively secure the hitch step 420, or more specifically, the top clamp 478, around the hitch ball 52. In those embodiments, in which the top clamp 478 may not fit securely around the base 94 of the hitch ball 52, the adapter 493 may be used to create a more secure fit. The adapter 493 may be of a shape and size such that it fits around the base 94 of the hitch ball 52.

Figure 17:
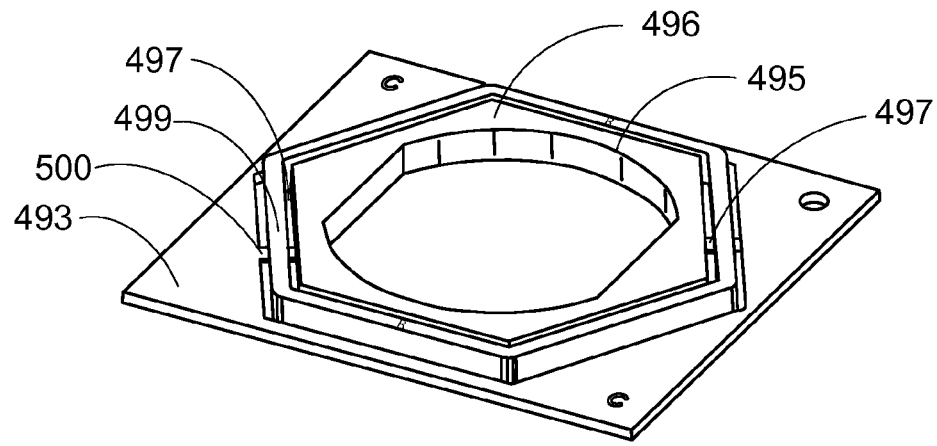
FIG. 17 is a perspective view of an adapter for use with a hitch step.

As shown in FIG. 17, the adapter 493 may include an opening 495 of a predetermined shape. The shape of the opening 495 may include two generally semi-circular sections opposed one another with two flats generally opposed to one another. This shape opening 495 may be particularly useful with the base 94 of the hitch ball 52 is of a similar shape—see FIG. 12. In such embodiments, the opening 495 may generally match the shape of the base 94. This may permit the adapter 493 and top clamp 478 to securely attach with the hitch ball receiver 26.

Figure 13:
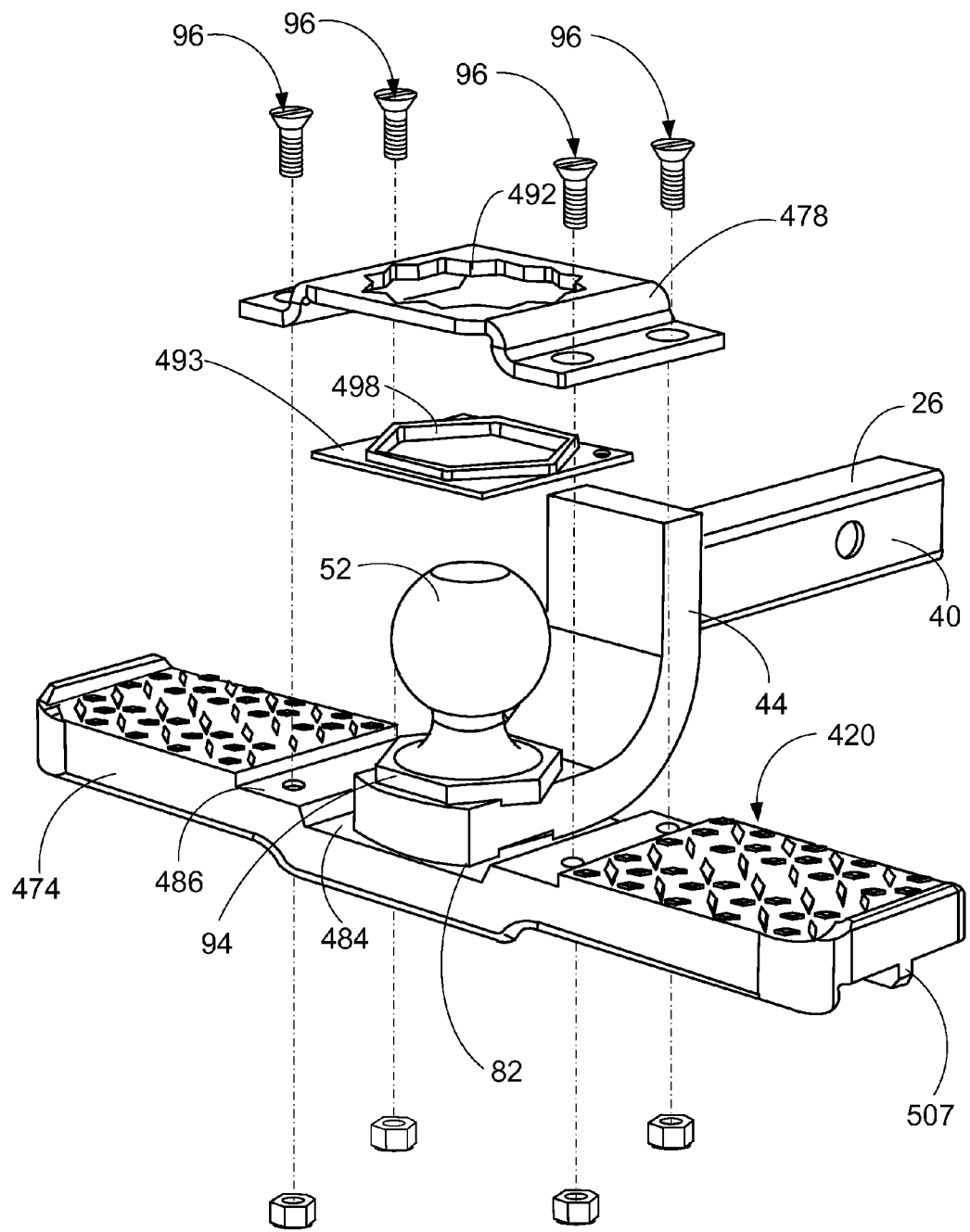
FIG. 13 is a perspective exploded view of embodiments of a hitch step utilizing an adapter.
Figure 18:
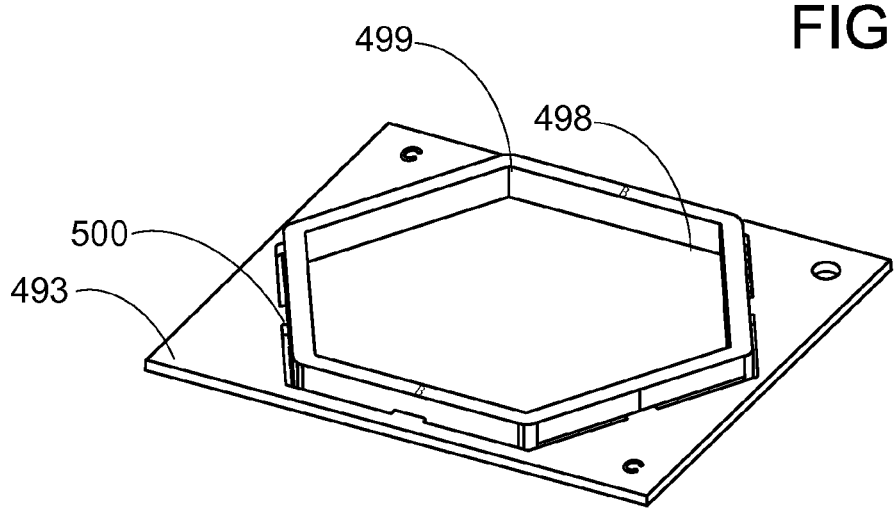
FIG. 18 is a perspective view of an adapter for use with a hitch step.

The adapter 493, however, may also be utilized with the base 94 of a different shape and configuration. In such embodiments, the adapter 493 may include a first removable portion 496. The first removable portion 496 may include frangible tabs 497. The user may break the frangible tabs 497—such as by hand or utilizing a tool—and remove the first removable portion 496. This may result in the adapter 492 having a second shaped opening 498 that is of a generally different shape than that of the first opening 495. As shown in FIG. 18, the resulting adapter 493 may have a second shaped opening 498 that may be of a generally hexagonal shape. This shaped opening 498 may be particularly useful when the base 94 of the hitch ball 52 is generally hexagonal, such as shown in FIG. 13.

Figure 14:
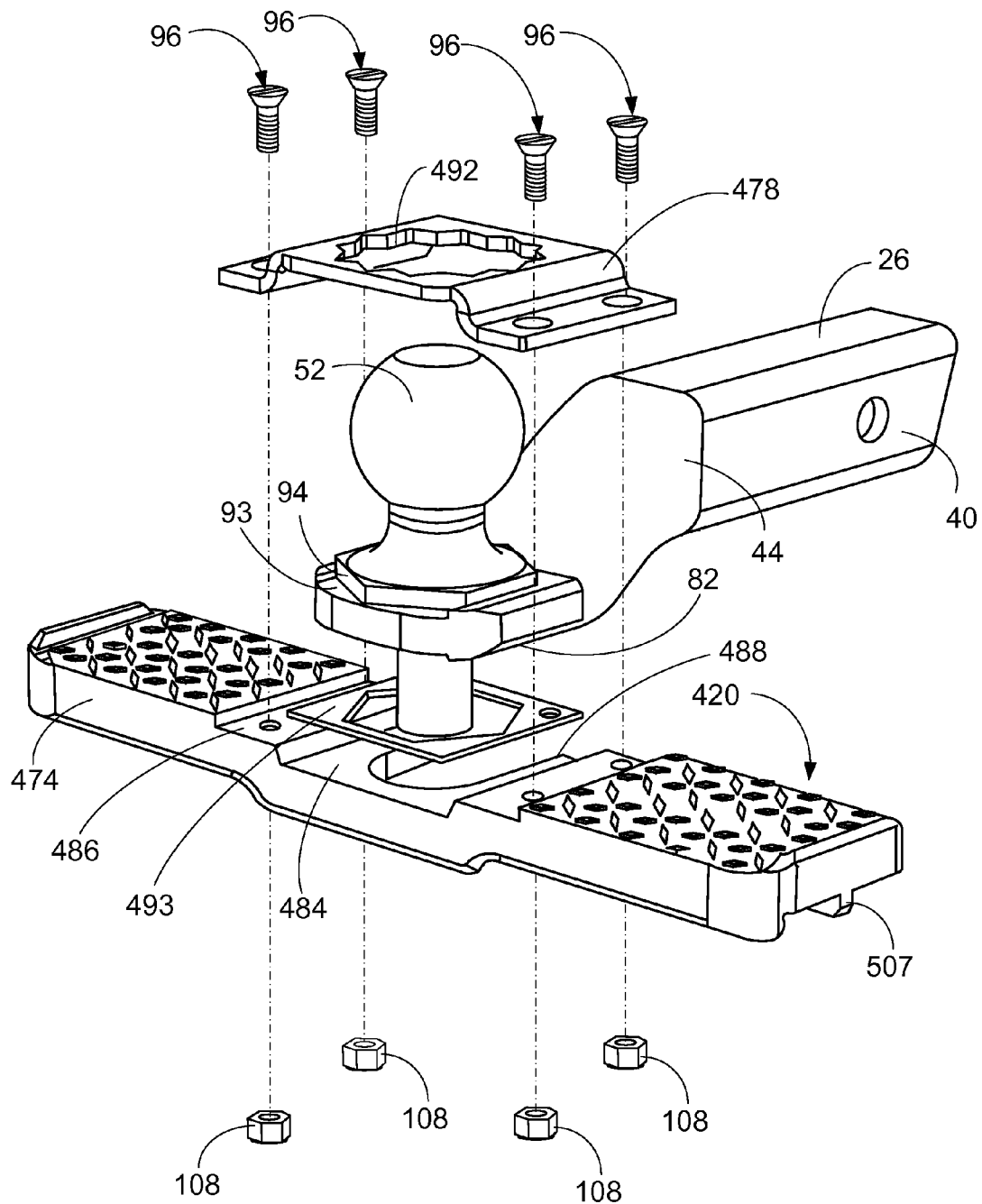
FIG. 14 is a perspective exploded view of embodiments of a hitch step utilizing an adapter.
Figure 19:
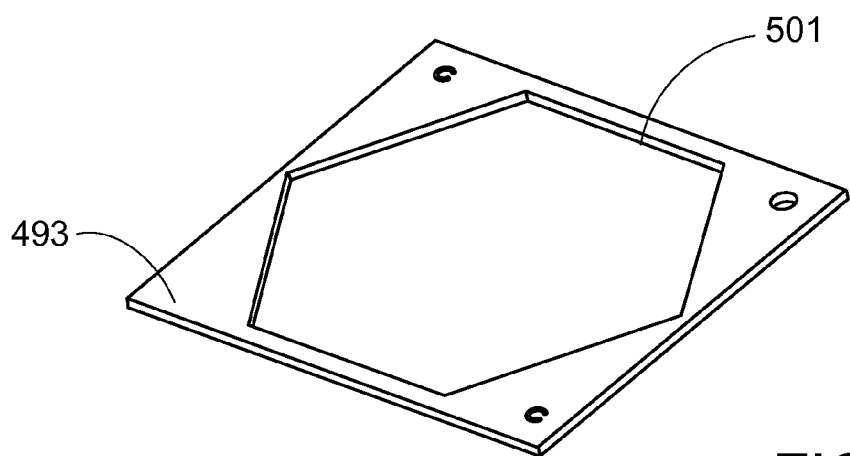
FIG. 19 is a perspective view of an adapter for use with a hitch step.

In some embodiments, the adapter 493 may include a second removable portion 499 that may include frangible tabs 500. In these embodiments, the user may break the frangible tabs 500 and remove the second removably portion 499 from the adapter 493. This may result in the adapter 493 having a third shaped opening 501 that is of a generally different size or shape than that of the first and second openings 495, 498. As shown in FIG. 19, the resulting adapter 493 may have a third sized opening 501 that may be of a generally hexagonal shape. This may result in the adapter 493 being configured to be utilized a spacer, as shown in FIG. 14 or as the spacer 110 shown in FIGS. 3A and 4, mentioned above. The spacer 110 or 493 may add extra clamping surface to a hitch ball receiver 26 for the hitch step body 74, 474 and top clamp 78, 478 to engage.

Figure 15:
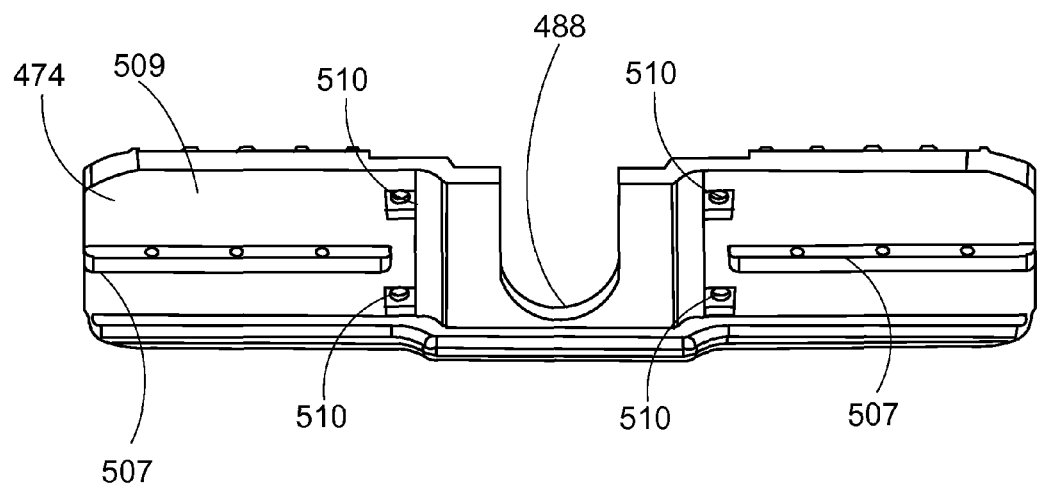
FIG. 15 is an underside perspective view of embodiments of a hitch step.
Figure 16:
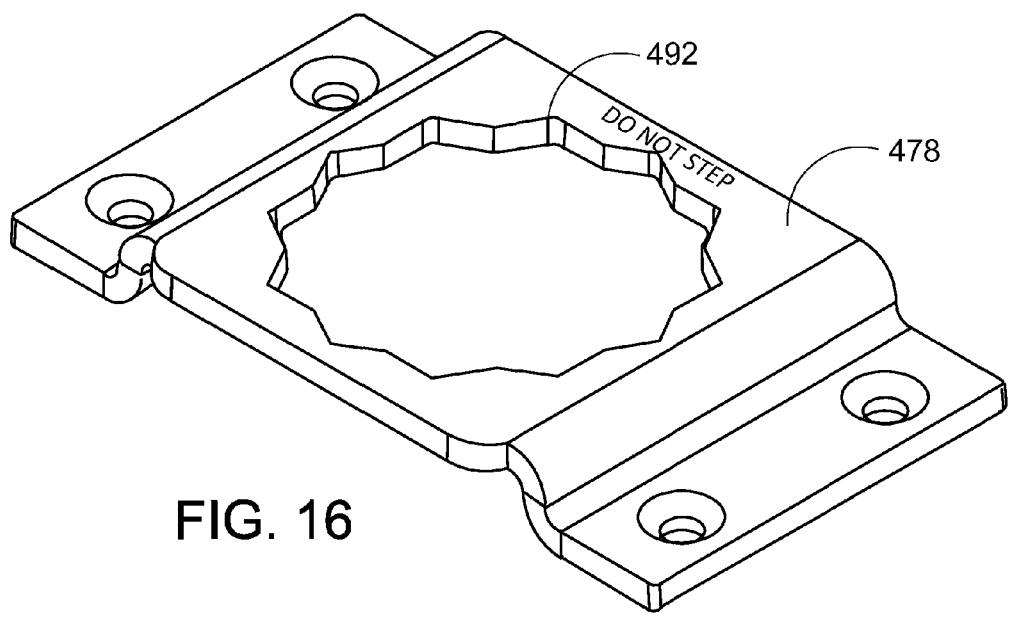
FIG. 16 is a perspective view of a top clamp.

Further as shown in FIG. 15, the step body 474 may include a raised boss 507 attached or otherwise formed with the step body 474. As shown, the raised boss 507 may be attached to an underside 509 of the step body 474. The raised boss 507 may be attached such as through welding or forming as a monolithic member with the step body 474. The raised boss 507 may act as a stiffener for the step body 474 to add strength to the step body 474. The raised boss 507 may also be configured to add lights, reflectors or other accessories thereto. The raised boss 507 may permit the user to add these accessories and the like.

As also shown in FIG. 15, the underside 509 of the step body 474 may include generally non-circular slots 510. The non-circular slots 510 may be configured to engage the nuts 108 of the fasteners 104. In such embodiments, the nuts 108 may engage the slots 510. The nuts 108 engaging the slots 510 may hold the nut 108 preventing the requirement to use an additional wrench to tighten the nuts 108.

The top clamp 478 may be selectively secured to the hitch step body 474 such that the top clamp 478 and hitch step body 474 may generally clamp to the hitch ball receiver 26, or more specifically, the tongue 44, between each other. At least one fastener 506 may selectively secure the top clamp 478 to the hitch step body 474. By way of a non-limiting example, four fasteners 506 may be utilized, but the present teachings are not limited to such. Any appropriate number of fasteners 506 may be utilized. In such embodiments, the hitch step body 474 may be positioned below the tongue 44 of the hitch ball receiver 26, as described above. The appropriate shaped adapter 493, if to be added, may be utilized and positioned over the hitch ball 52 or may be utilized as the spacer as shown in FIG. 14. The appropriate portions of the adapter 493, if any, may be removed to create the adapter or spacer of appropriate shape and configuration. The top clamp 478 may then be positioned over the tongue 44 of the hitch ball receiver 26, i.e., the top clamp 478 may be positioned over the hitch ball 52 such that the hitch ball 52 passes through the aperture 492 of the top clamp 478.

The top clamp 478 and hitch step body 474 being selectively secured together may generate sufficient clamping force to secure the hitch step 420 to the hitch ball receiver 26 without any additional engagement of features of the hitch step 420 and hitch ball receiver 26. By way of a non-limiting example, the clamping force may sufficient to make it unnecessary for the hitch step 420 to engage side portions of the hitch ball receiver 26, or more specifically, sidewalls of the tongue 44. Specifically, the clamping force applied by selectively securing the top clamp 478 and hitch step body 474 as described above may make it unnecessary for both of the top clamp 478 and the hitch step body 474 to engage sidewalls of the tongue 44 to secure the hitch step 420 to the hitch ball receiver 26.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A hitch step providing a stepping surface, the hitch step selectively securable to a hitch ball receiver, the hitch step comprising:

a step body operatively engaged with an underside portion of the hitch ball receiver, wherein the step body has a width providing a stepping surface, the step body forming a majority portion of a surface area of the stepping surface such that a portion of the stepping surface is laterally aligned with the hitch ball receiver;

a clamp body selectively secured to the step body and positioned on a top portion of the hitch ball receiver; and at least one fastener selectively securing the clamp body to the step body with the hitch ball receiver positioned between the clamp body and the step body.

2. The hitch step of claim 1, wherein the stepping surface transversely extends from both sides of the hitch ball receiver.

3. The hitch step of claim 1, wherein the step body and the clamp body operatively clamp the underside portion and top side portion, respectively, of the hitch ball receiver securing the step body and clamp body to the hitch ball receiver.

4. The hitch step of claim 3, wherein the step body and clamp body do not engage sidewalls of the hitch ball receiver.

5. The hitch step of claim 1, further comprising an aperture in the clamp body, the aperture configured to allow a hitch ball to be passed therethrough.

6. The hitch step of claim 5, wherein the clamp body includes first and second clamp bodies.

7. The hitch step of claim 6, wherein the first and second clamp bodies include recesses that form the aperture when the first and second clamp bodies are selectively secured to the step body, whereby the hitch ball is capable of passing through the aperture.

8. The hitch step of claim 5, further comprising a hitch ball, wherein a feature on the hitch ball engages with a surface of the aperture in the clamp body to limit relative rotation between the step body and hitch ball.

9. The hitch step of claim 1, further comprising an adapter positionable between the clamp body and hitch ball receiver, the adapter including a first adapter aperture and a first frangible potion removable from the adapter whereby removing the first frangible portion forms a second adapter aperture, the second adapter aperture having a different shape or size than the first adapter aperture.

10. The hitch step of claim 9, wherein the adapter includes a second frangible portion removable from the adapter whereby removing the second frangible portion forms a third adapter aperture, the third adapter aperture having a different shape or size than the first and second adapter apertures.

11. The hitch step of claim 9, wherein the adapter includes a first feature that engages with a surface of the aperture in the clamp body to limit rotation of the step body relative to the hitch ball receiver.

12. The hitch step of claim 1, further comprising a traction surface attached to the step body.

13. The hitch step of claim 12, wherein the traction surface includes at least one of a diamond pattern integrally formed with the step body and a rubber surface attached to the step body.

14. The hitch step of claim 1, further comprising at least one locating screw positioned in the step body, the locating screw configured to selectively engage a sidewall of the hitch ball receiver.

15. A hitch step selectively securable to a hitch ball receiver having a tongue, the hitch step comprising:
a step body capable of circumscribing at least a portion of the tongue, wherein the step body has a top surface and a width providing a step surface on which a user steps;
a clamp body selectively secured to the step body and positioned over the tongue of the hitch ball receiver; and
at least one fastener selectively securing the clamp body to the step body.

16. The hitch step of claim 15, further comprising a spacer engaged with the tongue and positioned between the clamp body and step body.

17. The hitch step of claim 15, wherein the hitch ball receiver includes a hitch ball secured to the tongue, whereby the clamp body is configured to be selectively secured to the step body while the hitch ball is secured to the tongue.

18. The hitch step of claim 15, wherein neither of the step body nor the clamp body engage a sidewall of the tongue.

19. The hitch step of claim 15, further comprising a traction surface attached to the step body.

20. The hitch step of claim 15, further comprising at least one locating screw positioned in the step body, the locating screw configured to selectively engage a sidewall of the hitch ball receiver.

21. A hitch step selectively securable to a hitch ball receiver, the hitch step comprising:
a step body, a portion of which is positioned below the hitch ball receiver, wherein the step body has a width providing a stepping surface;
a clamp body secured to the step body and positioned on a top portion of the hitch ball receiver, wherein the hitch ball receiver is clamped between the step body and clamp body; and
an adapter positionable between the clamp body and hitch ball receiver, the adapter including a first adapter aperture and a first frangible potion removable from the adapter whereby removing the first frangible portion forms a second adapter aperture, the second adapter aperture having a different shape or size than the first adapter aperture.

22. The hitch step of claim 21, wherein the adapter includes a second frangible portion removable from the adapter whereby removing the second frangible portion forms a third adapter aperture, the third adapter aperture having a different shape or size than the first and second adapter apertures.

23. The hitch step of claim 22, wherein the adapter having the first and second frangible portions removed from the adapter forms a spacer positionable between an underside of the hitch ball receiver and the step body.

24. The hitch step of claim 22, wherein the hitch ball receiver includes a hitch ball having a base, whereby at least one of the first or second apertures is shaped and sized to engage the base of the hitch ball.

25. The hitch step of claim 21, wherein the adapter includes a first feature that engages with a surface of an aperture in the clamp body to limit rotation of the step body relative to the hitch ball receiver.

26. A hitch step selectively securable to a hitch ball receiver, the hitch step comprising:
a step body operatively engaged with an underside portion of the hitch ball receiver, wherein the step body has a width providing a stepping surface;
a clamp body selectively secured to the step body and positioned on a top portion of the hitch ball receiver;
at least one fastener selectively securing the clamp body to the step body with the hitch ball receiver positioned between the clamp body and the step body; and
an adapter positionable between the clamp body and hitch ball receiver, the adapter including a first adapter aperture and a first frangible potion removable from the adapter whereby removing the first frangible portion forms a second adapter aperture, the second adapter aperture having a different shape or size than the first adapter aperture.

27. The hitch step of claim 26, wherein the adapter includes a first feature that engages with a surface of an aperture in the clamp body to limit rotation of the step body relative to the hitch ball receiver.

28. The hitch step of claim 26, further comprising at least one locating screw positioned in the step body, the locating screw configured to selectively engage a sidewall of the hitch ball receiver.

29. A hitch step selectively securable to a hitch ball receiver, the hitch step comprising:
- a step body operatively engaged with an underside portion of the hitch ball receiver, wherein the step body has a width providing a stepping surface;
- a clamp body selectively secured to the step body and positioned on a top portion of the hitch ball receiver; and
- a traction surface attached to the step body.

30. The hitch step of claim 29, further comprising at least one locating screw positioned in the step body, the locating screw configured to selectively engage a sidewall of the hitch ball receiver.

31. A hitch step selectively securable to a hitch ball receiver having a tongue, the hitch step comprising:
- a step body capable of circumscribing at least a portion of the tongue, wherein the step body has a width and a top surface providing a step surface for a user;
- a clamp body selectively secured to the step body and positioned over the tongue of the hitch ball receiver;
- at least one fastener selectively securing the clamp body to the step body; and
- a spacer engaged with the tongue and positioned between the clamp body and step body.

32. The hitch step of claim 31, further comprising at least one locating screw positioned in the step body, the locating screw configured to selectively engage a sidewall of the hitch ball receiver.

\* \* \* \* \*